H. MUND.
SNAP HOOK FOR HARNESS.
No. 47,972. Patented May 30, 1865.
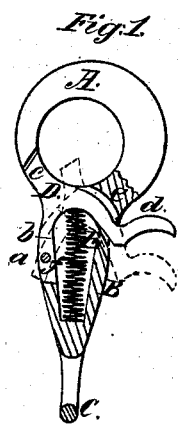
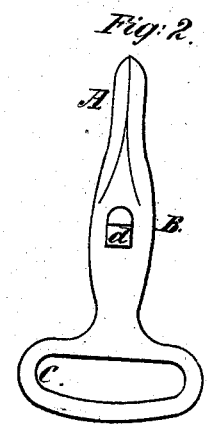

UNITED STATES PATENT OFFICE.

HERMANN MUND, OF CHICAGO, ILLINOIS.

IMPROVED SNAP-HOOK.

Specification forming part of Letters Patent No. 47,972, dated May 30, 1865.

*To all whom it may concern:*

Be it known that I, HERMANN MUND, of Chicago, in the county of Cook and State of Illinois, have invented a new and Improved Snap-Hook for Harnesses and for Similar Purposes; and I do hereby declare that the following is a full, clear, and exact description thereof, which will enable those skilled in the art to make and use the same, reference being had to the accompanying drawings, forming part of this specification, in which—

Figure 1 is a side sectional view of my invention; Fig. 2, an edge view of the same.

Similar letters of reference indicate corresponding parts.

This invention has for its object facility in opening the snap, so that it may be readily engaged with the strap or part designed to be connected with it, and also readily disconnected therefrom.

The invention consists in having the hook provided with a snap which is hung or works upon a pivot, and has a spring bearing against it in such a manner that the spring will have a tendency to keep the snap in contact with the end of the hook and confine the end of the strap or other article in the hook, the snap being provided with a projection or thumb-piece to admit of it being readily operated upon and opened or thrown free from the end of the hook when necessary to release the part connected with it.

A represents the hook, constructed of metal, and having a shank, B, with an eye, C, at its end, in which eye the strap or chain is secured.

D represents the snap, which is also of metal, and is hung or secured on a pivot, $a$, the latter passing through the shank B transversely. The snap may be described as being composed of three projecting arms, $b$ $c$ $d$, the pivot $a$ passing through one arm, $b$, near its end, the arm $c$ bearing against the end of the hook A, when the latter is closed, and the arm $d$ serving as a thumb-piece, the latter passing through a slot, $e$, in the shank and projecting some distance beyond it. The arm $c$ is curved to correspond to the curvature of the hook A, and a spiral spring, E, which is fitted in a recess, $f$, in the shank B, bears against the arm $d$, and has a tendency to keep the end of the arm $c$ in contact with the end of the hook A, as will be fully understood by referring to Fig. 1.

In order to free or liberate the strap or other article from the hook, or to attach the former to the latter, all that is required is simply to press down the arm $d$, as shown in red in Fig. 1, and the arm $c$ will be moved within the hook and out of the way, so as not to interfere with the article to be fitted in or moved out from the hook. On releasing the arm $d$ the spring E instantly throws the arm $c$ in contact with the end of the hook. The end of the hook A and arm $c$ of the snap D are beveled to form a bearing-surface for the arm $c$.

I do not claim, broadly, a spring-snap for a hook, for they have been previously devised and arranged in various ways; but I do claim as new and desire to secure by Letters Patent—

A snap, D, for a hook, provided with or composed of the arms $b$ $c$ $d$, arranged with a spring, E, within the shank B, and pivoted to the shank, in the manner substantially as and for the purpose set forth.

HERMANN MUND.

Witnesses:
  W. H. F. CASE,
  J. SCHOENEWALD.